United States Patent [19]

Le Roy et al.

[11] 4,367,302
[45] Jan. 4, 1983

[54] THERMOPLASTIC POLYURETHANE RESIN HAVING ISOCYANATE END GROUPS AND CONTAINING ETHYLENIC SIDE GROUPS

[75] Inventors: Patrice M. Le Roy, Ballancourt; Sabine M. Journeau, Arpajon, both of France

[73] Assignee: Societe Nationale des Poudres et Explosifs, Paris, France

[21] Appl. No.: 258,810

[22] Filed: Apr. 30, 1981

[30] Foreign Application Priority Data

May 14, 1980 [FR] France ............................ 80 10805

[51] Int. Cl.$^3$ .............................................. C08G 18/32
[52] U.S. Cl. .................................. 524/104; 156/330.9; 524/315; 524/590; 528/75
[58] Field of Search ............ 260/30.2, 31.2 N, 31.4 R, 260/33.6 UB; 528/75; 156/330.9; 524/104, 315, 590

[56] References Cited

U.S. PATENT DOCUMENTS 3,061,574 10/1962 Smith ...................................... 528/75
4,195,146 3/1980 Markiewitz et al. ................. 528/75

FOREIGN PATENT DOCUMENTS 1211430 10/1959 France .
1366079 6/1964 France .
1418816 10/1965 France .
1061773 3/1967 United Kingdom .

OTHER PUBLICATIONS

Aleeo et al., Chem Abstr, vol. 72, 101171y, 1970, p. 5, No. 20.
Aleeo et al., Abstr of Izv. Akad. Nauk. SSSR. Ser. Khim. 1969, (12), 2840-2, Consultants, Bureau, Plenum Publ., NY.

Primary Examiner—Maurice J. Welsh
Attorney, Agent, or Firm—Bucknam and Archer

[57] ABSTRACT

The invention relates to new crosslinkable thermoplastic polyurethane resins having isocyanate end groups and containing ethylenic side groups.

According to the invention, the polyurethane resins result from the reaction of:
(a) an organic diisocyanate,
(b) a saturated diol and
(c) an unsaturated diol of the formula:

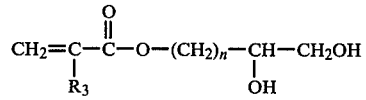

in which $R_3$=Me or H and n is an integer between 1 and 4. 2,3-Dihydroxypropyl acrylate will preferably be used.

Application to glues, in particular for lamination with the aid of a two-step glueing process which consists, in a first step, in crosslinking the acrylic bonds in order to increase the tack of the film, and then in crosslinking the NCO groups.

14 Claims, No Drawings

THERMOPLASTIC POLYURETHANE RESIN HAVING ISOCYANATE END GROUPS AND CONTAINING ETHYLENIC SIDE GROUPS

The invention relates to new crosslinkable thermoplastic polyurethane resins having isocyanate end groups and containing ethylenic side groups.

The invention also relates to the compositions which can be used as adhesive coatings and which are obtained from these resins.

The invention also relates to a new process which makes it possible to process these resins.

Elastomeric polyurethanes having isocyanate and acrylate end groups are known in the state of the art.

These polyurethanes are the product resulting from the reaction of a prepolymer having isocyanate end groups, which is obtained from a triol, with an acrylic or methacrylic acid ester of a diol, for example propylene glycol monoacrylate. The proportions of the acrylic or methacrylic acid ester are such that some isocyanate groups remain available at the end of the reaction.

However, the structure of these resins is poorly defined because, statistically, resins will be obtained in which all the NCO groups have reacted with the acrylic acid esters, whilst in other resins, the majority of NCO groups will still be available at the end of the reaction.

Furthermore, because of the branched structure of the prepolymer, these polyurethanes have a low thermoplasticity and this correspondingly restricts their possible processing methods.

These resins are used as adhesive coatings.

In the particular field of laminating glues (for aluminium/polyester laminates, aluminium/polyethylene laminates and the like), it is necessary to use glues of low viscosity.

In fact, the machines commonly used for this application require products of very low viscosity in order to make it possible to deposit a small weight of product per unit area. In the case of the traditional products, the viscosity is lowered either by means of a solvent, which has to be removed, or by means of an excess of isocyanate, which does not make it possible to prepare laminates of a quality suitable for use with foodstuffs and presents the laminator with hygiene problems. Furthermore, the traditional products of low viscosity cause the two films to slide at the moment of lamination, because of the absence of tack, and do not make it possible to handle the laminate as long as the isocyanates have not reacted sufficiently with the atmospheric moisture.

The object of the invention is to provide resins which can be processed in accordance with the well-known traditional processes for thermoplastics (injection moulding, extrusion, dissolution, rotational moulding, compression moulding and the like) and then crosslinked to form a three-dimensional lattice, whilst preserving some of the isocyanate groups, which will subsequently make it possible to use these materials as adhesives. The new resins are of great value for preparing glues of low viscosity, which can be used, for example, in the lamination industry with a traditional machine.

A further object of the invention is to provide a new process which is particularly suitable for the resins of the invention and which makes it possible to ensure a good tack before the isocyanate groups have reacted with the atmospheric moisture, which prevents the two films from sliding over one another.

According to the invention, the polyurethane resins are characterised in that they result from the reaction of:

(a) an organic diisocyanate, (b) a saturated diol having a molecular weight of between 450 and 4,000 and preferably between 500 and 2,500, and (c) an unsaturated diol consisting of the acrylic or methacrylic acid ester of a trihydric alcohol, of the formula:

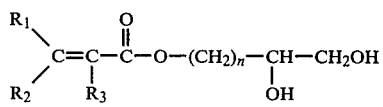

in which $R_1$ and $R_2$, which are identical or different, are hydrogen, a lower alkyl group, an aryl group or a halogen atom, $R_3$ is hydrogen, a lower alkyl, aryl or cycloalkyl group or a halogen and n is an integer between 1 and 4, the diisocyanate compound (a) being present in a ratio NCO:OH of more than 1.1 and the molar ratio diol (b):diol (c) being between 0 and 3.

In the description which now follows, the term "side groups" will denote the ethylenic groups which have not reacted and which are present, like branches, over the whole length of the linear skeleton of the polyurethane molecule.

The term "acrylic groups" will be understood generically as meaning all the substituted or unsubstituted ethylenic double bonds conjugated with a carbonyl group.

The diisocyanates which can be used within the scope of the invention are well known and any compounds which contain two free NCO groups can advantageously be used. Amongst these compounds, there may be mentioned aliphatic, cycloaliphatic and aromatic diisocyanates having a molecular weight of less than 300, such as, for example: 1,3- and 1,4-xylylene diisocyanates, 2,4- and 2,6-tolylene diisocyanates (TDI), 4,4'-diphenylmethane diisocyanate (MDI), 1,5-naphthylene diisocyanate, 1,4- and 1,6-hexamethylene diisocyanates, 1,4-tetramethylene diisocyanate, 4,4'-methylene-bis-(cyclohexyl isocyanate) (Hylene w), 4,4'-isopropyl-bis-(cyclohexyl isocyanate), 1,4-cyclohexyl diisocyanate and 3-isocyanatomethyl-3,5,5-trimethylcyclohexyl isocyanate (IPDI).

Usually, the aromatic diisocyanates are used in applications which do not require a high degree of stability to light. Thus, the aliphatic or cycloaliphatic isocyanates will preferably be used for applications requiring good optical properties (transparency, absence of coloration), a good fastness to adverse weather conditions (fastness to UV) and good properties at low temperature; in this case, 4,4'-methylene-bis-(cyclohexyl isocyanate) will advantageously be used.

The term "saturated long-chain diols" is understood as meaning macrodiols which have a molecular weight of between 450 and 4,000, preferably between 500 and 2,500, and which can consist of polyester, polyether, polytetrahydrofuran, polycaprolactone and polycarbonate groups, depending on the importance given to the well-known specific characteristics provided by each of these units.

Thus, it is well known that, if it is desired to obtain polyurethane resins which are resistant to hydrolysis and have good properties at low temperature, it is advantageous to use polyethers. Polyesters will provide improvements in terms of the mechanical properties. Polycarbonates are very advantageous because of their excellent mechanical properties, their resistance to hydrolysis and their adhesive properties.

Amongst the polyesters, there may be mentioned poly-(ethylene glycol) adipate, poly-(propylene glycol) adipate and, in general, polyesters prepared from a saturated diacid, or its anhydride, and a saturated diol, such as those which have been mentioned above. Polycaprolactones may be mentioned as a sub-class of polyesters.

Polyether-esters, such as poly-(diethylene glycol) adipate, in which the polyether replaces part of the glycol, may also be mentioned.

Polydiol carbonates which may be mentioned are polybutanediol carbonate or polyhexanediol carbonate.

Amongst the polyethers, there may be mentioned poly-(ethylene glycol) ethers, poly-(propylene glycol) ethers or also polytetrahydrofuran.

Amongst the unsaturated diols (d) having acrylic or methacrylic unsaturation, it is particularly advantageous to employ a diol consisting of the acrylic or methacrylic acid ester of a trihydric alcohol, of the formula:

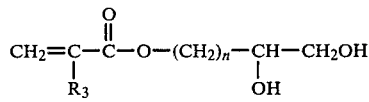

in which $R_3$ and n have the same meaning as above. These products are described, in particular, in French Pat. No. 1,211,430.

In fact, although the use of unsaturated diols in which the terminal ethylenic carbon is substituted (see general formula) is not excluded according to the invention, the reactivity of these diols is distinctly lower.

Preference will be given to 2,3-dihydroxypropyl acrylate. A particularly advantageous process for obtaining this product has been described in French patent application No. 77/15,716 of the applicant company.

In order to obtain a prepolymer having isocyanate end groups, it is necessary to prepare the polyurethane resin with an excess of diisocyanate.

Thus, in general terms, the reaction will be carried out with a ratio NCO:OH which is greater than or equal to 1.1, preferably, greater than or equal to 1.2.

In order to improve the conditions under which the product is processed (modify the rheological behaviour, reduce its viscosity and so on), it can prove advantageous to limit the molecular weight of the polyurethanes. In this case, it will be advantageous to carry out the reaction with a ratio NCO:OH of about 2.

In order to obtain products of low viscosity, it is advantageous to carry out the reaction with a ratio long-chain diol (b): unsaturated diol being between 0.5 and 2.5 and preferably about 2.

It is also possible to replace a part of the unsaturated diol by a saturated chain extender such as short chain diol, alcanolamine or diamine. The molar ratio chain extender unsaturated diol being between 0 and 10.

A suitable procedure for preparing the resins of the invention consists in reacting the saturated long-chain diol with an excess of diisocyanate, so as to obtain the saturated prepolymer, and then to react the unsaturated diol with excess prepolymer. It is also possible to react the unsaturated diol with an excess of diisocyanate. The unsaturated prepolymer thus obtained can be used as such or modified to give a longer prepolymer by reacting it with a saturated long-chain diol.

The rate of the reaction between the isocyanate and the polyols can be increased either by means of the metal-ammine catalysts which are well known to those skilled in the art, or by increasing the temperature; the reaction can be carried out at temperatures between 40° and 110° C.; however, it will preferably be carried out at temperatures below 70° C. If it is desired to carry out the reaction at a higher temperature, it can be advantageous to add a small amount of a free-radical polymerisation inhibitor in order to avoid any risk of premature crosslinking. Examples of inhibitors which can be used are hydroquinone or phenothiazine, in amounts of between 0 and 5,000 ppm.

The polyurethane resins have a particularly advantageous application in compositions for glues, varnishes, paints and mastics which crosslink under the action of moisture. They possess a greatly improved adhesive power because of the acrylic side groups.

A particularly advantageous application of these polyurethane resins having isocyanate end groups consists in diluting them with unsaturated monomers of the acrylic or vinyl type, in order to prepare glues of low viscosity which can be used, for example, in the lamination industry (for aluminium/polyester laminates, aluminium/polyethylene laminates and the like).

The monomers thus act as a reactive diluent system. Amongst the monomers, there may be mentioned: vinyl monomers (vinyl acetate, N-vinylpyrrolidone, styrene); and acrylic or methacrylic monomers (alkyl acrylate, phenoxyethyl acrylate, hexanediol diacrylate, ethoxyethyl acrylate, trimethylolpropane triacrylate and the methacrylate equivalents of the abovementioned compounds).

However, the methacrylic monomers are of less value than the acrylic monomers because of their lower reactivity. The viscosity of the composition thus formed will depend on the proportion of monomers present. In general, a ratio polyurethane resin:monomer of between 95/5 and 40/60, but preferably between 90/10 and 70/30, will be used.

It has been found that it is possible to improve the adhesive power and the properties of these compositions by adding thereto a saturated prepolymer having isocyanate end groups. If appropriate, this prepolymer can be based on the long-chain diol which was used to synthesise the polyurethane resin according to the invention.

Depending on the particular case, the proportion by weight of saturated prepolymer to polyurethane resin according to the invention will be between 80/20 and 20/80.

The present invention also relates to a new process for causing two substrates to adhere to one another with the aid of resins or compositions according to the present invention.

The glueing process consists in covering a first substrate with a layer of a composition as defined above, the thickness of the layer depending on the nature of the substrates. This composition is then crosslinked.

The crosslinking of the unsaturated polyurethane or the polyurethane/monomer mixture can be carried out in accordance with any of the well-known processes of free-radical polymerisation. The following may be mentioned in particular: thermal polymerisation or high-frequency polymerisation, in the presence or absence of free-radical promoters (peroxides, hydroperoxides or azo-type promoters), at the customary polymerisation temperatures, but preferably at between 50° and 170° C. Non-limiting examples of promoters which may be mentioned are dicumyl peroxide, tert.-butyl peroxide, benzoyl peroxide, lauroyl peroxide, cumene hydroperoxide, dicyclohexyl percarbonate, azo-bis-isobutyronitrile and the like.

However, it is advantageous to employ a means of polymerisation at ambient temperature under ultraviolet irradiation, in the presence of photoinitiators or photosensitisers, under the customary conditions. Non-limiting examples of photoinitiators which may be mentioned are: benzoin ethers and phenone derivatives, by themselves or in association with an amine (benzophenone, diethoxyacetophenone, Irgacure 651 from CIBA or Darocur 1116 from MERCK).

However, this type of polymerisation is limited, on the one hand, to the applications for which the products do not contain large amounts of filler, and, on the other hand, to low thicknesses (less than 1 mm and preferably less than 100 μm).

The tack of the film deposited in this way is considerably increased. The second substrate is then applied and the product thus obtained is left for the time required to allow the residual NCO linkages to crosslink.

The compositions according to the invention can be used for substrates of very diverse types, such as, for example, for aluminium/polyester laminates, aluminium/polyethylene laminates and the like.

The value of the invention will be understood more clearly with the aid of the examples to be found below.

EXAMPLE 1

Preparation of an unsaturated prepolymer with isocyanate end groups

In a first stage, an intermediate A is prepared by reacting diphenylmethane diisocyanate (MDI) with a polyether-diol of molecular weight 2,000 (PPG 2010 of OH number = 1.07) in a ratio NCO/OH = 2. The reaction is carried out by the dropwise addition of PPG to molten MDI at 80° C. The reaction is complete after 6 hours 45 minutes at 80° C.; the viscosity of the product thus obtained is 38,000 mPas at 22° C. and its NCO number is 0.85 eq/kg.

2,3-Dihydroxypropyl acrylate is added to the intermediate internal product A, prepared above, in a ratio NCO/OH = 2. After a reaction time of two hours at 60° C., the unsaturated prepolymer B is obtained, the degree of unsaturation of which is 0.48 and the viscosity of which is 20,400 mPas at 50° C.

EXAMPLE 2

The following compositions are produced starting from the products A and B prepared in accordance with Example No. 1 (parts are by weight):

| COMPOSITION | REFERENCE | | | |
| --- | --- | --- | --- | --- |
| | $X_1$ | $X_2$ | $X_3$ | $X_4$ |
| A | 0 | 35 | 45 | 30 |
| B | 70 | 35 | 25 | 30 |
| REACTIVE DILUENT EDGA | 30 | 30 | 30 | 40 |
| PHOTOINITIATOR DAROCUR 1116 | 3 | 3 | 3 | 3 |
| VISCOSITY AT 23° C., mPas | 19,000 | 6,900 | 6,700 | <1,000 |

The formulations $X_1$, $X_2$, $X_3$ and $X_4$ are deposited thinly on an aluminium foil and the whole then passes, at a speed of 3.8 m/minute, under an ultraviolet lamp having a power of 80 watt/cm. The tack of the film deposited in this way is considerably increased. The application of the polyethylene or polyester film is carried out immediately after the UV irradiation.

The laminate is left for eight days to allow the isocyanate groups to crosslink. The peel strengths of the laminates prepared in this way are given below.

| | Delamination value in g/1.5 cm | | | |
| --- | --- | --- | --- | --- |
| REFERENCE | $X_1$ | $X_2$ | $X_3$ | $X_4$ |
| Al/polyethylene | 30 | 110 | 95 | 95 |
| Al/polyester | 20 | 100 | 100 | 100 |

EXAMPLE 3

The following compositions are produced starting from the products A and B prepared in accordance with Example No. 1 (parts are by weight):

| | |
| --- | --- |
| saturated prepolymer A: | 40 |
| unsaturated prepolymer B: | 20 |
| phenoxyethyl acrylate: | 30 |
| photoinitiator: DAROCUR 1116 | 3 |

This formulation is deposited on a 20μ thick aluminium foil by means of a machine. The weight deposited is 5.6 g/m².

The formulation has a viscosity of 6,800 mPas at 25° C.

The whole is passed under an ultraviolet lamp as above.

The laminates ae produced at 50° C. with different films. The delamination values for each film are indicated in the table below.

| | Delamination force g/1.5 cm |
| --- | --- |
| polyethylene | 175 |
| polyester | 175 |
| polypropylene | 210 |
| polyamide | 220 |
| cellophane | 150 |

We claim:

1. Thermoplastic polyurethane resin having isocyanate end groups and containing internal ethylenic side groups, useful as an adhesive, which comprises the product resulting from the reaction of:
    (a) an organic diisocyanate,
    (b) a saturated diol having a molecular weight of between 450 and 4,000 and
    (c) an unsaturated diol consisting of the acrylic or methacrylic acid ester of a trihydric alcohol, of the formula:

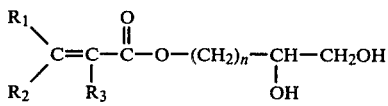

in which $R_1$ and $R_2$, which are identical or different, are hydrogen, a lower alkyl group, an aryl group or a halogen, $R_3$ is hydrogen, a lower alkyl, aryl or cycloalkyl group or a halogen and n is 1, 2, 3 or 4, the diisocyanate compound (a) being present in a ratio NCO:OH of more than 1.1 and the molar ratio diol (b):unsaturated diol (c) being between 0 and 3.

2. Polyurethane resin according to claim 1, wherein the unsaturated diol (c) has the formula:

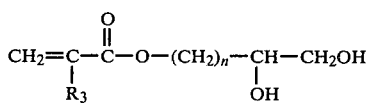

$R_3$ and n having the same meaning as in claim 1.

3. Polyurethane resin according to claim 2, wherein the unsaturated diol (c) is 2,3-dihydroxypropyl acrylate or methacrylate.

4. Polyurethane resin according to claim 1, wherein the ratio NCO:OH is about 2.

5. Crosslinkable adhesive composition, which is formed by a mixture of:
   A. a polyurethane resin according to one of the preceding claims and
   B. a reactive solvent which is a member selected from the group consisting of vinyl and acrylic monomers,
the weight ratio polyurethane resin A:reactive solvent B being between 95/5 and 40/60.

6. Crosslinkable adhesive composition according to claim 5, wherein a prepolymer, having isocyanate end groups, of a saturated long-chain diol is also added, the proportion by weight of the said prepolymer to the polyurethane resin being between 0.25 and 4.

7. Crosslinkable adhesive composition according to claim 6, wherein the saturated long-chain diol of the prepolymer is the same as the long-chain diol (b) of the polyurethane resin.

8. Process for causing two substrates to adhere to one another, wherein in the first step, the first substrate is covered with a resin according to claim 1 or composition according to claim 5; the resin or composition is then crosslinked in accordance with a means of free-radical polymerisation; the second substrate is then applied; and the final product is then left for the time required for the crosslinking of the free NCO groups in the polyurethane resin.

9. The resin according to claim 1, wherein the saturated diol (b) has molecular weight between 500 and 2,500.

10. The composition according to claim 5, wherein the weight ratio of said polyurethane resin A to reactive solvent B is between 90/10 and 70/30.

11. The resin according to claim 1, wherein the diisocyanate has a molecular weight of less than 300.

12. The resin according to claim 1, wherein the diisocyanate compound (a) is present in a ratio of NCO:OH greater than or equal to 1.2.

13. The resin according to claim 1, wherein the ratio of long-chain diol (b) to the unsaturated diol is between 0.5 and 2.5.

14. The resin according to claim 1, wherein part of the unsaturated diol is replaced by a saturated chain extender, which is a member selected from the group consisting of short-chain diols, alkanolamines and diamines and the molar ratio of said chain extender to said unsaturated diol is between 0 and 10.

* * * * *